United States Patent [19]

Kawanishi

[11] Patent Number: 4,742,877
[45] Date of Patent: May 10, 1988

[54] COMBINATION WEIGHING METHOD

[75] Inventor: Shozo Kawanishi, Kobe, Japan

[73] Assignee: Yamato Scale Company, Limited, Akashi, Japan

[21] Appl. No.: 944,877

[22] Filed: Dec. 22, 1986

[30] Foreign Application Priority Data

Apr. 25, 1986 [JP] Japan .................................. 61-97408

[51] Int. Cl.⁴ ............................................ G01G 19/22
[52] U.S. Cl. ............................................ 177/1; 177/25
[58] Field of Search .................................. 177/1, 25.18

[56] References Cited

U.S. PATENT DOCUMENTS

| | | |
|---|---|---|
| 4,385,671 | 5/1983 | Hirano . |
| 4,416,341 | 11/1983 | Hirano, I .......................... 177/25.18 |
| 4,470,166 | 9/1984 | Hirano . |
| 4,473,126 | 9/1984 | Hirano, II .................... 177/25.18 X |
| 4,589,506 | 5/1986 | Hirano . |
| 4,630,695 | 12/1986 | Connors et al. ............. 177/25.18 X |

FOREIGN PATENT DOCUMENTS 58-12621  1/1983  Japan .

Primary Examiner—George H. Miller, Jr.
Attorney, Agent, or Firm—Senniger, Powers, Leavitt and Roedel

[57]     ABSTRACT

An improved combination weighing method applicable to a prior art "double-shift type" combination weighing machine, in which a plurality of batches of product are weighed respectively and the resultant weight values are combined in various fashion to select from the resultant combinations of batches a combination whose total weight satisfies a predetermined condition, for improving the combination accuracy by modifying the combination selecting operation without any change in the number of batches of product which can participate in the combination arithmetic.

6 Claims, 7 Drawing Sheets

COMBINATION WEIGHING METHOD

BACKGROUND OF INVENTION

This invention relates to a novel and improved combination weighing method and, more particularly, to a highly accurate combination selecting method applicable to a conventional combination weighing machine.

As is well known in the art, in a combination weighing machine, batches of product are weighed by a plurality of weighing units and the resultant weight values are combined to select from the resultant combinations a combination whose total weight is, for example, nearest to a predetermined target value. The batches of product corresponding to the selected combination is then unloaded. In an automatic combination weighing machine, a combination arithmetic and delivery cycle of this type is repeated. In order to improve machine efficiency, a so-called "double-shift" system is generally used, in which the combination arithmetic operation is commenced using only the weighing weighing units not selected in the preceding cycle. Such a system is disclosed, for example, in U.S. Pat. Nos. 4,385,671; 4,470,166 and 4,589,506 and Japanese opened patent specification No. 58-2621, the latter of which discloses such a system as shown in FIG. 1 of the present application, in which batches of product are delivered successively at short time intervals and diverted alternately into a pair of collection chutes for preventing their intermixing.

In this double-shift system, it has not been believed possible to improve the combination accuracy using a fixed number of weight values to be combined, since the combination selected in each cycle is nearest to the target value and this automatically results in the minimum mean deviation of the total weights of the selected combinations with respect to the target weight. Accordingly, it has been a general practice of the prior art for improving the combination accuracy to increase the number of weight values which can participate in the combination arithmetic by increasing the total number of weighing units and/or providing auxiliary hoppers. However, increasing the number of structural components renders the device more complicated, larger and more costly.

SUMMARY OF THE INVENTION

Accordingly, an object of this invention is to provide a method for reducing the mean deviation of the total weight values of selected combinations with respect to the target value, without any change in the total number of weight values participating in the combination arithmetic.

The inventor has experimentally discovered that the minimum mean deviation is not always obtained by such a method as used in the prior art double-shift system, in which a combination whose total weight is nearest to the target weight is selected independently every cycle. The following table shows an example of the experimental data.

| No. | A 344 | B 354 | C 476 | D 442 | E 351 | F 380 | G 368 | H 333 | I 417 | J 377 | K 341 | SUM (gram) |
|---|---|---|---|---|---|---|---|---|---|---|---|---|
| 1  |   |   | * |   | * |   |   | * |   |   | * | 1501 |
| 2  |   | * |   |   | * | * |   |   | * |   |   | 1502 |
| 3  |   |   |   | * | * |   | * |   |   |   | * | 1502 |
| 4  |   |   |   | * | * |   |   | * |   | * |   | 1503 |
| 5  |   |   |   |   |   |   | * |   | * | * | * | 1503 |
| 6  | * |   | * |   | * |   |   | * |   |   |   | 1504 |
| 7  | * |   |   | * |   |   |   |   |   | * | * | 1504 |
| 8  |   | * | * |   |   |   |   | * |   |   | * | 1504 |
| 9  | * |   |   | * | * |   | * |   |   |   |   | 1505 |
| 10 |   | * |   | * |   |   | * |   |   |   | * | 1505 |
| 11 |   |   |   | * | * | * |   | * |   |   |   | 1506 |
| 12 | * |   |   |   |   |   | * |   | * | * |   | 1506 |
| 13 |   | * |   | * |   |   |   | * |   | * |   | 1506 |
| 14 |   |   |   |   |   | * | * |   | * |   | * | 1506 |
| 15 | * | * | * |   |   |   |   | * |   |   |   | 1507 |

This table shows fifteen (15) combinations calculated and selected by a computer from all combinations of four (4) weight values extracted from eleven (11) weight values of weighing units A, B, . . . K(as shown in grams just under A, B, . . . K) and arranged in the ascending order of their total weight values from what is greater than and nearest to 1500 grams, the target weight. According to the prior art combination operation, the 1st combination having the least total value (1501 grams) is selected first and, in the next cycle, the 12th combination excluding units C, E, H and K of the 1st combination and having the least total value (1506 grams) is selected. Accordingly, their average value of the 1st and 12th combinations is 1503.5 grams, and their average deviation is 3.5 grams. It will be noted, however, that the 2nd combination (1502 grams) and the 7th combination (1504 grams) include no common unit and have an average deviation of only 3.0 grams, which is less than what is obtained in the prior art. Thus, it is possible to reduce the average deviation, as compared to the prior art, by selecting a pair of combinations having the least secondary (combined) sum from respective pairs extracted from all combined total values obtained in the respective cycles, and discharging the selected pair of combinations through two respective chutes.

The combination weighing method of this invention is based upon the abovementioned principle and, as a feaure thereof, a pair of batches including no common batch and having a sum satisfying a predetermined condition are selected from the total weight values obtained by combining in various fashion a plurality of weight values obtained by weighing a plurality of batches of product respectively and, then, discharging them separately.

These and other objects and features of this invention are described in detail below with reference to the accompanying drawings.

DESCRIPTION OF PREFERRED EMBODIMENTS

Figure 1:
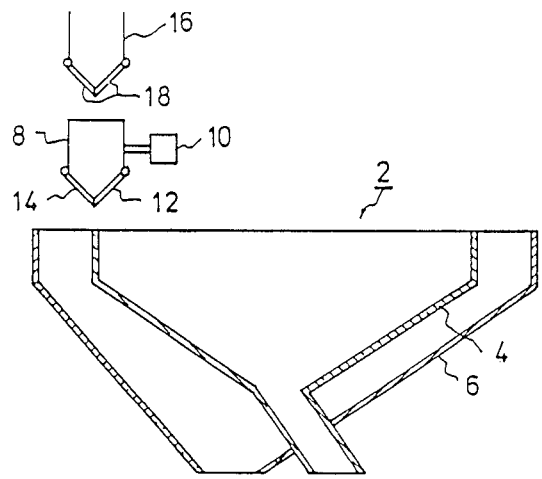
FIG. 1 is a simplified sectional side view representing a combination weighing machine used for executing typical embodiments of the combination weighing method according to this invention.

The combination weighing machine shown in FIG. 1 includes a collection chute structure 2 located in the center of the machine comprising an inner chute 4 and an outer chute 6 which are arranged concentrically so as to collect product independently and deliver product through separate outlet ports at the bottom of the chute structure. Above the collection chute structure 2, a plurality of weighing hoppers 8 (only one is shown for simplicity) are arranged circularly around the periphery of the inner chute 4, and each weighing hopper 8 is associated with a weight sensor 10 such as load cell for sensing the weight of product fed into the corresponding hopper 8 to produce a weight indicative signal. Each weighing hopper 8 is provided with inside and outside unloading gates 12 and 14 which are independently driven (opened) to discharge the content of the hopper into the inner and outer chutes 4 and 6, respectively, as described later. A loading hopper 16 is disposed just above each weighing hopper 8 for temporarily holding product fed by a feeding device (not shown) and feeding it into the emptied weighing hopper 8 when its loading gate 18 is opened. Such general structure and operation of this type of machine is known in the art and will not be described further.

Figure 2:
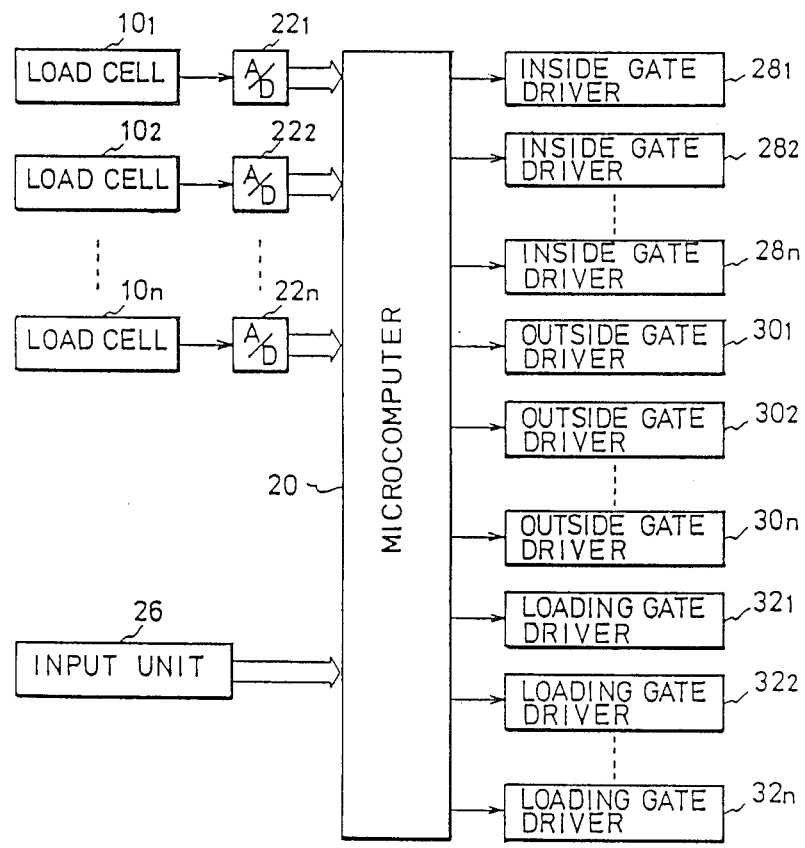
FIG. 2 is a block diagram representing an electric control system of the combination weighing machine shown in FIG. 1.

As shown in FIG. 2, the weight indicative signals produced by respective weight sensors such as load cells $10_1, 10_2, \ldots 10_n$ are applied to a microcomputer 20 through analog-to-digital (A/D) convertors $22_1, 22_2, \ldots 22_n$, respectively, which convert the analog weight indicative signals into digital form. Before operation, a target (reference) combined weight TW and an allowable upper limit weight UL are determined and supplied from an input unit 26 such as keyboard device. These applied data are arithmetically processed by the microcomputer 20 in accordance with an operation program stored therein and, as a result of this process, the microcomputer 20 provides command signals to some of the inside gate drivers $28_1, 28_2, \ldots 28_n$ or outside gate drivers $30_1, 30_2 \ldots 30_n$, which correspond respectively to those weighing hoppers 8 selected to provide an optimum combined weight of product. The inside and outside gate drivers 28 and 30 are coupled to respective inside and outside unloading gates 12 and 14 of corresponding weighing hoppers 8 to open them in response to the applied command signals. When the selected weighing hoppers 8 have been unloaded in this manner, the microcomputer 20 sends another set of command signals to corresponding loading gate drivers $32_1, 32_2, \ldots 32_n$ for opening the loading gates 18 of those loading hoppers 16 corresponding to the emptied weighing hoppers 8 to reload them with new product.

Figure 3:
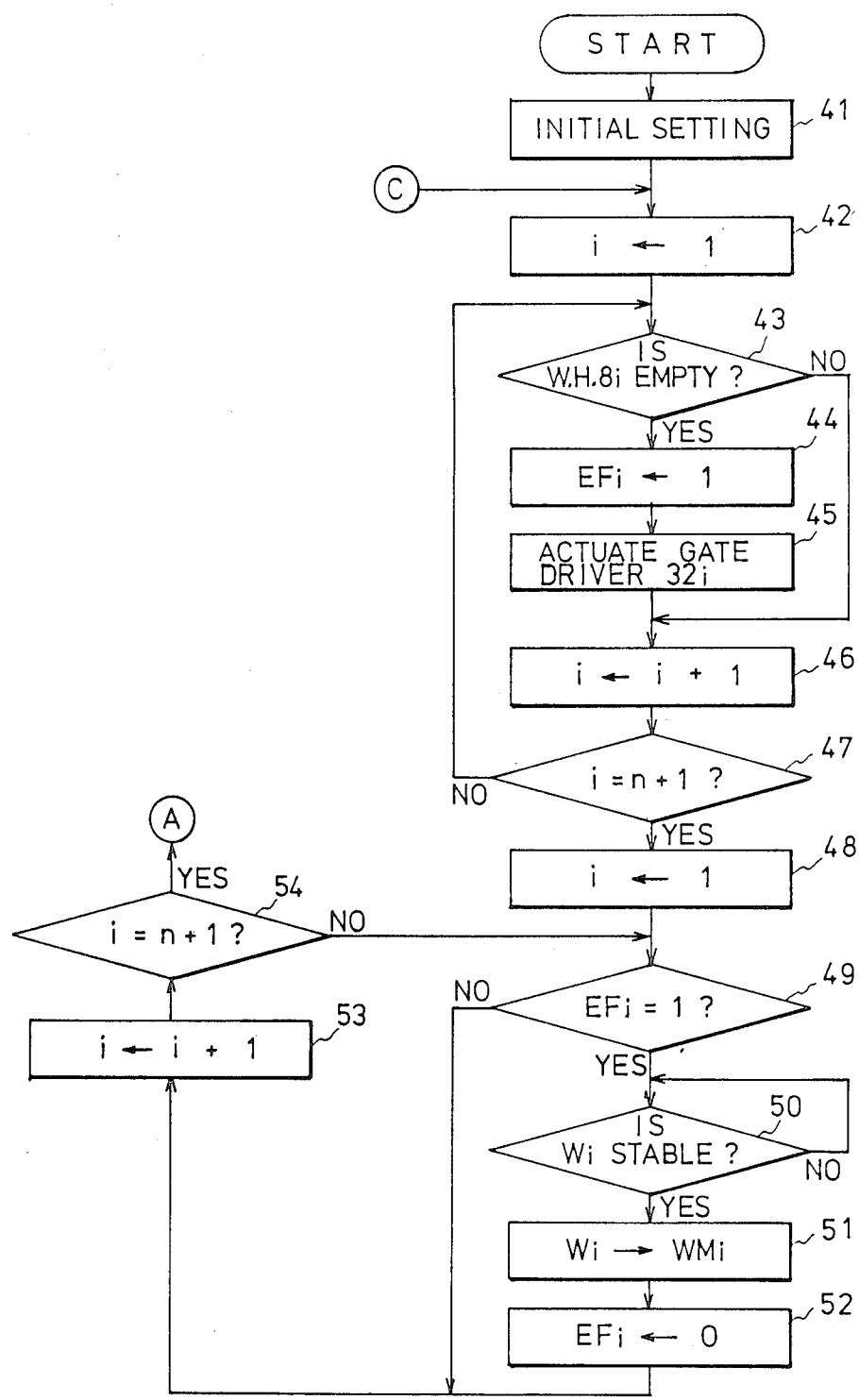
FIGS. 3 to 5 are flow charts representing an operation program of the microcomputer of the system of FIG. 2 used for executing a first embodiment of the method of this invention.

Now, the description will be made about a first embodiment of the method of this invention with reference to FIGS. 3 to 5. In the drawings, FIG. 3 shows a program for a loading and weighing process.

In the first step 41, a predetermined target weight TW and an allowable upper limit weight UL are input through keyboard 26 and empty flags $EF_i$ for all weighing hoppers $8_i$ (i=1, 2, ... n) are reset to logic "0" as an initial setting and, in the next step 42, count "i" of an i-counter in microcomputer 20 is set to decimal "1". The decimal number "i" is used for distinguishing specific weighing hoppers 8 and other components, such as weight sensors 10, loading hoppers 16 and A/D converters 22, associated therewith. It is inquired, in step 43, whether the weighing hopper $8_i$ (now, $8_1$) is empty or not. This judgement is made on the basis of the magnitude of the output signal of A/D convertor $22_i$. If the answer is YES, the corresponding empty flag $EF_i$ (now, $EF_1$) is made logic "1" in step 44 and the unloading gate driver $32_i$ (now, $32_1$) is actuated to open the loading gate 18 of the corresponding loading hopper $16_i$ (now, $16_1$) in step 45. Thus, the empty weighing hopper $8_i$ (now, $8_1$) is loaded with new product. Then, the i-counter is incremented by one (i.e., the count becomes decimal "2") in step 46. Thereafter, it is inquired, in step 47, whether count "i" has reached "n+1" or not and, if not, the program returns to step 43 and the same process is repeated sequentially for all weighing hoppers 8. If the answer in step 43 is NO, that is, the inquired hopper is filled, the program jumps to step 46 and the same procedure follows. Accordingly, all weighing hoppers 8 are filled with product when the answer in step 47 becomes YES.

When the answer in step 47 becomes YES, the i-counter is reset to logic "1" in step 48 and it is inquired whether the corresponding empty flag $EF_i$ (now, $EF_1$) is logic "1" or not in step 49. If YES, as will usually be the case, it is further inquired, in step 50, whether the corresponding weight (indicative) signal $W_i$ (now, $W_i$) has become stable or not. This judgement is effected, for example, on the basis of a predetermined lapse of time after loading the weighing hopper and, if No, the same inquiry is repeated until YES is obtained. If YES is obtained, the incoming weight signal $W_i$ (now, $W_1$) is stored in a corresponding weight memory location $WM_i$ in microcomputer 20 in step 51, the corresponding empty flag $EF_1$ (now, $EF_i$) is reset to logic "0" in step 52 and the i-counter is incremented by one in step 53. Then, it is inquired whether count "i" has reached "n+1" or not in step 54 and, if NO, the program returns to step 49 to repeat the same procedure for all weight signals $W_i$. If the answer in step 49 is NO, step 53 follows. When YES is obtained in step 54, all weight signals $W_i$ (i=1, 2, ... n) are stored in respective memory locations $WM_i$ and the system is ready for starting a combination arithmetic operation according to this invention.

Figure 4:
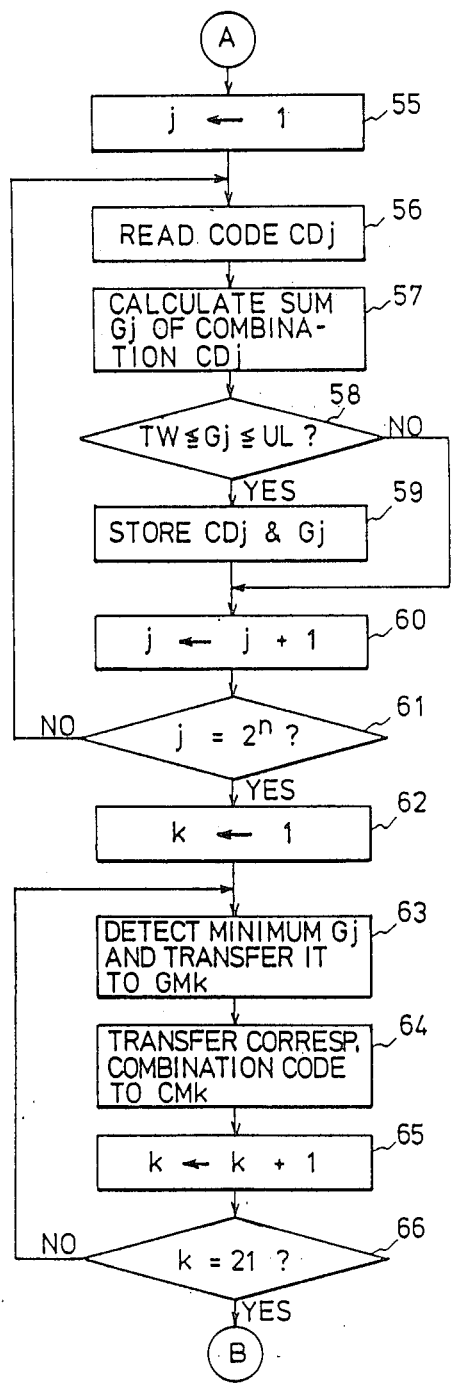

FIG. 4 shows a program for a combination calculating and storing process. In this process, respective sum weights of all $2^n-1$ sets of possible combinations of the stored weight signals $W_i$ (i=1, 2, ... n) are calculated and those sum weights above the target (reference) weight TW and below the allowable upper limit weight UL and the corresponding combinations are stored in ascending order from the least to the twentieth.

If the answer in step 54 of FIG. 3 is YES, count "j" of a j-counter in microcomputer 20 is set to decimal "1" in step 55. The decimal number "j" assumes integers 1, 2, ... $2^n$, $2^n-1$ which are respectively allotted to combination codes $CD_j$ which are inherently given to the abovementioned $2^n-1$ combinations of weight signals $W_i$(i=1, 2, ... n). Each combination code $CD_j$ is a n-bit binary code whose logic "1" digits correspond to those weighing hoppers forming the subject combination. These combination codes are previously stored in microcomputer 20. A combination code $CD_j$ (now, $CD_1$) is read out in step 56 and sum weight $G_j$(now, $G_1$) of the corresponding combination is calculated with reference to code $CD_j$ (now, $CD_1$) in step 57. Then, it is inquired in step 58 whether the calculated sum $G_j$ is between (inclusive of) TW and UL and, if YES, the sum $G_j$ and corresponding combination code $CD_j$ are stored in step 59 and j-counter is incremented by one in step 60. Thereafter, it is inquired in step 61 whether count "j" reaches "$2^n$" or not and, if NO, the program returns to step 56 and the same procedure is repeated for all combinations. If the answer in step 58 is NO, step 59 is jumped to disregard such sum. Accordingly, all sums falling between (inclusive of) TW and the UL and corresponding combination codes are stored in a memory when YES is obtained in step 61.

In the next step 62, count "k" of a k-counter in microcomputer 20 is set to decimal "1". The count "k" assumes decimal serial numbers from "1" to "20" which are used for distinguishing in ascending order the combined sums $G_j$ stored in step 59. The minimum or least of all such stored sums is detected and transferred to another memory location $GM_k$ (now, $GM_1$) in step 63 and the combination code $CD_j$ corresponding to the detected sum is also transferred to another memory location $CM_k$ (now, $CM_1$) in step 64. Then, the k-counter is incremented by one in step 65 and it is inquired whether "k" has reached "21" or not in step 66. If NO, the program returns to step 63 and the next minimum stored sum is detected from the remaining sums in the memory. Accordingly, when YES is obtained in step 66, twenty combined sums and corresponding combination codes are stored in the memory locations $GM_k$ and $CM_k$ (k=1, 2, ... 20), respectively, in ascending order of sum value.

Figure 5:
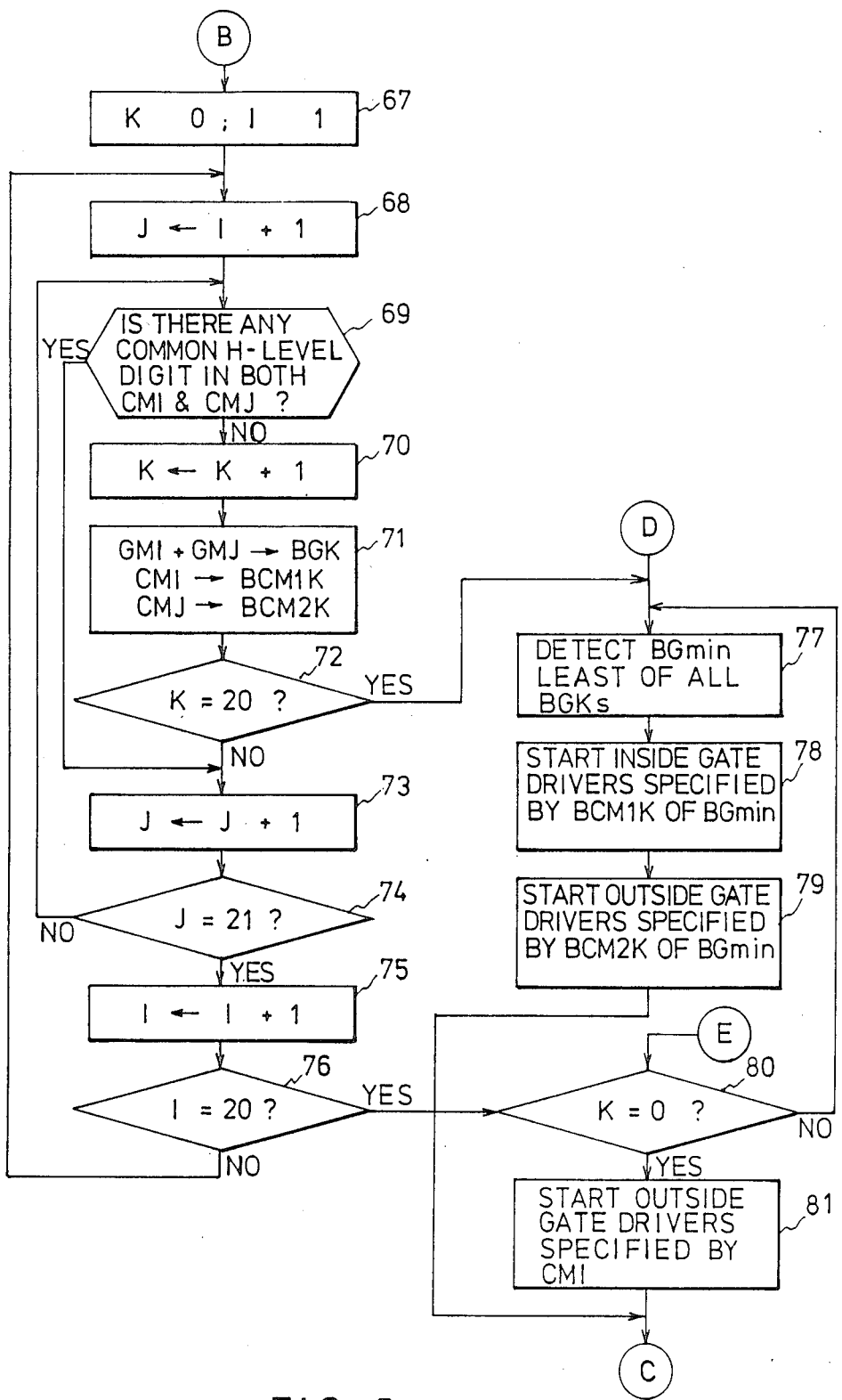

FIG. 5 shows a proram for a combination pairing and unloading process. In this process, all pairs picked up from the combination codes and corresponding minimum sums stored respectively in $CM_k$ and $GM_k$ (k=1, 2, ... 20) are examined to select a pair of combinations having no common "1" digit in their codes (that is, the two minimum sums of the pair do not communize any weighing hopper) and wherein the total of both minimum sums is least of all. Two groups of weighing hoppers corresponding to the selected pair of combinations are then unloaded respectively through the inner and outer chutes 4 and 6. If no such pair is found, the combination corresponding to the first minimum sum, that is, the least sum, is unloaded through one of the chutes (the outer chute 6 in this embodiment).

In this embodiment, all pairs of the stored combination codes are examined first in the order as shown in Table 1 with respect to the presence of a common "1" digit, that is, the commonality of the same weighing hopper. All pairs exhibiting such commonality are excluded and the total minimum sums of the other pairs are stored in a memory.

TABLE 1

| Cycle | Order of Examination (I/J) |
|---|---|
| | 1/2, 1/3, 1/4, ... 1/19, 1/20; |
| 2 | 2/3, 2/4, ... 2/19, 2/20; |
| 3 | 3/4, ... 3/19, 3/20; |
| . | |
| . | |
| . | |
| 18 | 18/19, 18/20; |
| 19 | 19/20. |

In this table, the pairs to be examined are referred to as "I/J" wherein "I" and "J" represent the serial numbers "k" indicative of respective stored combinations. It is obvious from mathematical knowledge that the number of such pairs is 190 when k=1, 2, ... 20. In order to execute the program, a further symbol "K" is introduced. In this embodiment, "K" is a serial number from "1" to "20" which is given sequentially to each successive pair in this examination. "I", "J" and "K" are counted respectively by I-, J- and K-counters in the microcomputer.

Referring to FIG. 5, the K-counter is reset to "0" and the I-counter is set to "1" in step 67 and the J-counter is set to "I" plus "1", that is, "2" in this case. In the next step 69, the combination codes stored respectively in $CM_I$ and $CM_J$ (now, $CM_1$ and $CM_2$) are compared and examined whether there is any common "1" level digit in both codes or not. If not, the K-counter is incremented by one (now, into "1") in step 71. Then, the sums stored in $GM_I$ and $GM_J$ (now, $GM_1$ and $GM_2$) are summed and the resultant total weight is stored in a memory location $BG_K$ (now $BG_1$) in step 71. In this step, the corresponding combination codes stored in $CM_I$ and $CM_J$ (now, $CM_1$ and $CM_2$) are transferred respectively to memory locations $BCM1_K$ and $BCM2_K$ (now, $BCM1_1$ and $BCM2_1$). It is then inquired in step 72 whether "K" has reached "20" or not. If not, or if YES in step 69, the J-couner is incremented by one (now, into "3") in step 73 and it is inquired whether count "J" reaches "21" or not in step 74. If not, the program returns to step 69 and the same steps are repeated. When YES is obtained in step 74, the first cycle of examination of Table 1 is completed and the I-counter is incremented by one (now, into "2") to initiate the second cycle of examination. In the next step 76, it is inquired whether count "I" has reached "20" or not and, if not, the program returns to step 68 and the same steps are repeated until K=20 in step 72 or I=20 in step 76 is obtained.

When the answer in step 72 is YES, twenty accepted pairs of combinations, each pair having no common "1" digit, and corresponding twenty total sums are stored in memory locations $BGM1_K$, $BGM2_K$ and $BG_K$ (K=1, 2, ... 20), respectively. In this case, the least one of the twenty total values stored in $BG_K$ is selected as $BG_{min}$ in step 77. Then, the inside gate drivers 28 specified by the corresponding code stored in $BCM1_{min}$ are actuated to unload the corresponding weighing hoppers into the inner chute 4 in step 78 and the outside gate drivers 30 specified by the corresponding code stored in BGM2$_{min}$ are actuated to unload the corresponding weighing hoppers into the outer chute 6 in step 79.

When the answer in step 76 is YES, the examination of all stored pairs has been completed without obtaining the target number (20) of desired pairs meeting the aforementioned criteria. Then, it is inquired in step 80 whether count"K" is zero, that is, whether no desired pair has been obtained. If NO, that is, some pairs have been obtained, steps 77, 78 and 80 are executed to select an optimum pair of combinations from these pairs to unload the corresponding weighing hoppers in similar fashion. If YES, those outside gate drivers 30 specified by the code stored in CM$_1$ corresponding to the least minimum sum are actuated to unload the corresponding weighing hoppers into the outer chute 6.

Figure 6:
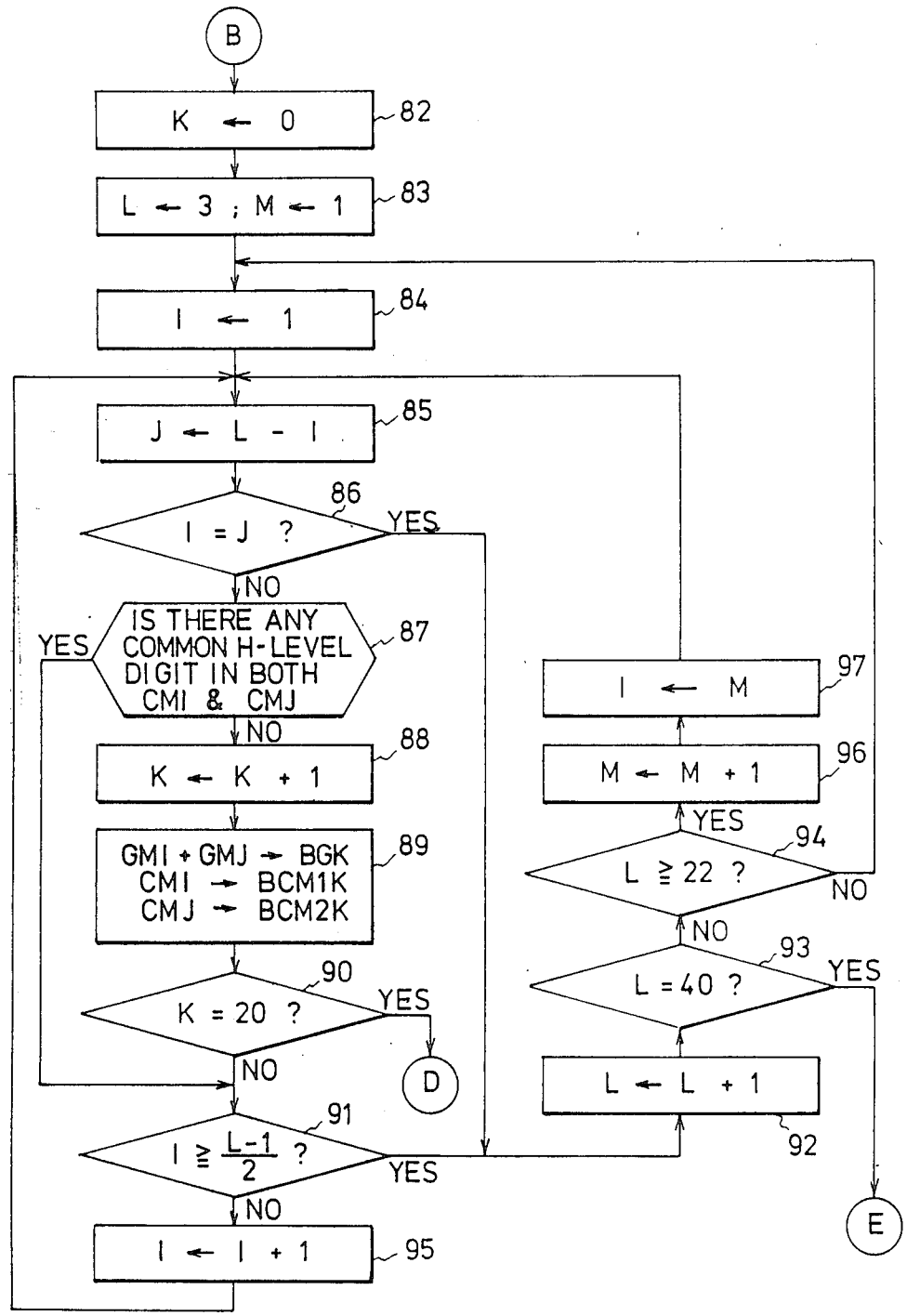
FIG. 6 is a flow chart representing a part of another operation program used for executing a second embodiment of the method of this invention.

FIG. 6 shows a program of a second embodiment of this invention based upon another order of examination as shown in Table 2.

TABLE 2

| Cycle | Order of Examination (I/J) |
|---|---|
| 1 | 1/2; |
| 2 | 1/3; |
| 3 | 1/4, 2/3; |
| 4 | 1/5, 2/4; |
| 5 | 1/6, 2/5, 3/4; |
| . | |
| . | |
| . | |
| 19 | 1/20, 2/19, . . . 10/11; |
| 20 | 2/20, 3/19, . . . 10/12; |
| . | |
| . | |
| . | |
| 37 | 19/20. |

It will be readily understood that this order of examination can reduce the time taken for obtaining the predetermined number K (=20 in this embodiment) of acceptable pairs.

The program of FIG. 6 follows that of FIG. 4. For executing this program, L- and M-counters are used in addition to I-, J- and K-counters used in the program of FIG. 5. Count "L" equals the sum of "I" and "J". Count "M" indicates the value of "I" at the start of each cycle. K-counter is reset to "0" in step 82 and L- and M-counters are set to "3" and "1", respectively, in step 83. Then, I-counter is set to "1" in step 84 and J-counter is set to "2" (=1−1=L−I) in step 85, thereby executing the first cycle of Table 2. It is first inquired in step 86 whether "I" is equal to "J" or not. If the answer is NO in this case, the program progresses through steps 87, 88, 89 and 90 in the same manner as in steps 69, 70, 71 and 72 in FIG. 5. In the next step 91, however, it is inquired whether "I" (now, "1") is equal to or greater than (L−1)/2 or not. As this value is "1" in the first cycle, the answer is YES and the L-counter is incremented by one (that is, into "4") in step 92. It is inquired in step 93 whether L equals "40" or not. If the answer is NO, the program returns to step 84 and J is changed into "3" (=4−1) in step 85 to start the second cycle of Table 2. Although the operation is effected similarly in this cycle, the answer in step 91 is NO since (L−1)/2=3/2. Therefore, I-counter is incremented by one (i.e., into "2") in step 95 and the program returns to step 85. In step 85, J is changed into "2" (=4−2). Accordingly, the answer in step 86 is YES and the program jumps to step 92 to increment the L-counter by one, that is, into "5". Thus, "I" is changed into "1" in step 84 and "J" is changed into "4" (=5−1) in step 85, thereby starting the third cycle of Table 2. It will be understood that steps 86 to 91 are executed in this cycle and that "I" is changed into "2" in step 95 and "J" is changed into "3" (=5−2) in step 85, thereby executing the second step of the third cycle as shown in Table 2. The remaining operation is executed similarly and thus no further description will be made thereon. When the value of "L" reaches "22" during the operation, step 94 is followed by step 96 in which M-counter is incremented by one (into "2", at first) and "I" is changed into "2" in step 97, thereby starting the next cycle with I=2. This cycle corresponds to the twentieth cycle as understood from Table 2. Thus, the value of "I" is incremented in similar fashion at the end of every cycle after this cycle. When the value of "K" reaches "20" or when the value of "L" reaches "40", the program progresses to step 77 or 80, respectively, to effect the same unloading operation as in FIG. 5.

Figure 7:
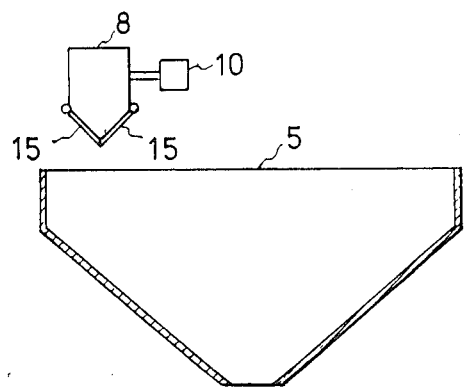
FIG. 7 is a simplified sectional side view representing a combination weighing machine of another type used for executing third and fourth embodiments of the method of this invention.
Figure 8:
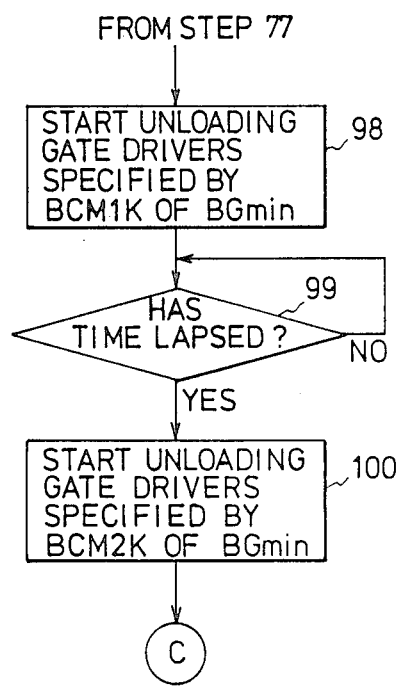
FIG. 8 is a flow chart representing part of a further operation program used for executing the third embodiment.

While two set of weighing hoppers forming each selected pair are unloaded respectively through inner and outer chutes 4 and 6 in the above embodiments, they can be unloaded through a single collection chute 5 as shown in FIG. 7 if both sets are unloaded one after another with a sufficient time interval therebetween. For effecting such operation, steps 98, 99 and 100 of FIG. 8 may be substituted for steps 78 and 79 of FIG. 5. In this program, the weighing hoppers corresponding to a selected combination stored in BCM$_{1K}$ are unloaded in step 98 and the weighing hoppers corresponding to another selected combination stored in BCM$_{2K}$ are unloaded in step 100, but only after a predetermined time interval as elapsed, as determined in step 99.

While, in the above embodiment, a pair of combinations having the least total weight is selected from the combinations having acceptable sum weights respectively, the same result is obtainable by selecting a single combination whose sum weight is closest to twice the target weight and which is composed of two sub-combinations each having an acceptable sum weight. This operation can be effected with a program as shown in FIG. 9.

Figure 9:
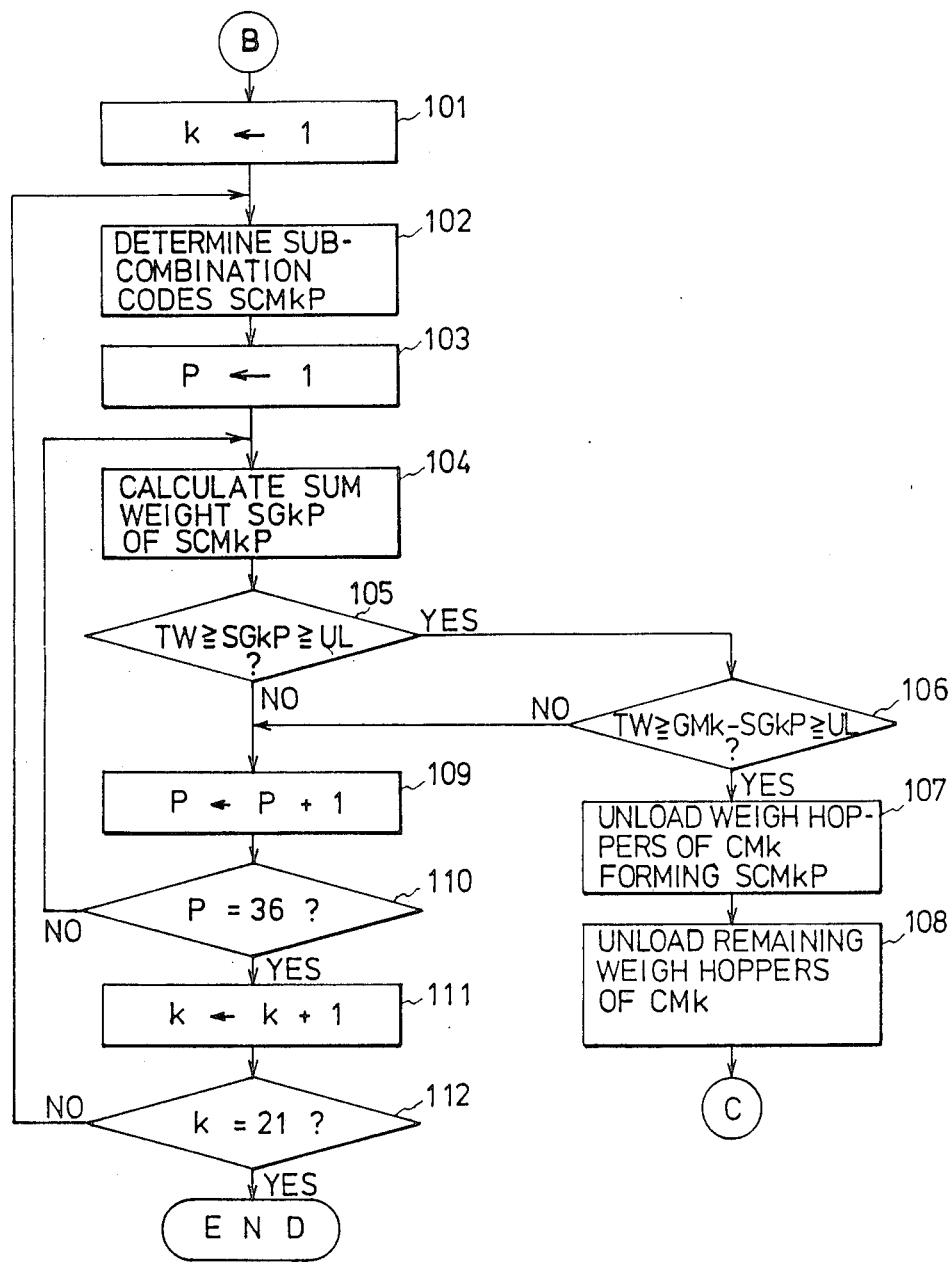
FIG. 9 is a flow chart representing a part of a still further operation program used for executing the fourth embodiment.

Before starting the program of FIG. 9, the respective sums of all combinations are calculated and arranged in a memory in ascending order from the first (least) to 20th, for example. This procedure is quite similar to that of the program in FIG. 4 except that it is inquired in step 58 whether the calculated sum G$_j$ falls between (inclusive of) 2TW and 2UL or not. When the answer in step 66 becomes YES, twenty acceptable sums and corresponding combination codes have been stored in ascending order in memory locations GM$_k$ and CM$_k$ (k=1, 2, . . . 20), respectively. In this embodiment, the number of weighing hoppers forming each acceptable combination must be even, since the combination is halved later to be unloaded as a pair of sub-combinations. For simplicity of description, it is assumed that this number of weighing hoppers is eight and the number of weighing hoppers forming each sub-combination is four. In the program of FIG. 9, a P-counter is used in addition to a k-counter. Count "P" distinguishes these sub-combinations derived from each acceptable combination. The number of four-membered sub-combinations derived from an eight-membered master combination can be calculated as seventy (70). However, the maximum count of P-counter may be thirty-five (35) for distinguishing each pair of sub-combinations.

Referring to FIG. 9, the k-counter is set to "1" in the first step 101 and sub-combination codes SCM$_{kP}$ (now, k=1; P=1, 2, . . . 35) derived from the combination stored in $CM_k$ (now, $CMhd\ 1$) are determined in step 102. Then, P-counter is set to "1" in step 103 and the sum weight $SG_{kP\ (now,\ SG_{11})}$ of subcombination $SCM_{kP}$ (now, $SCM_{11}$) is calculated in step 104. It is inquired in step 105 whether the calculated sum $SG_{kP}$ falls within (inclusive of) TW and UL or not and, if YES, it is also inquired in step 106 whether the remaining sum weight of the same master combination, that is, the difference between the sum weight stored in $GM_k$ (now, $GM_1$) and the calculated sum $SG_{kP}$ (now, $SG_{11}$), satisfies the same condition or not. If YES is obtained in step 106, the weighing hoppers forming the sub-combinations $SCM_{kP}$ (now, $SCM_{11}$) are unloaded in step 107 and the remaining weighing hoppers of the same master combination are unloaded in step 108.

If the answer in step 105 or 106 is NO, P-counter is incremented by one in step 109 and it is inquired in step 110 whether count "P" has reached "36" or not. If not, the program returns to step 104 to examine another sub-combination of the same master combination. If YES in step 110, the k-counter is incremented by one in step 111 and it is inquired in step 112 whether count "k" has reached "21" or not. If not, the program returns to step 102 to examine the sub-combinations of the next master combination. If YES is obtained in step 112, this means that no acceptable sub-combination exists and some readjustment is required.

The unloading operations of steps 107 and 108 may be effected through either a double-chute system as shown in FIG. 1 or a single-chute system as shown in FIG. 7.

It should be understood that the above decription was made about some embodiments of this invention and, without limitation to the details of these embodiments, various modifications and changes can be made within the scope of invention as defined in the appended claims.

I claim:

1. A combination weighing method for successively selecting from a plurality of combinations of weight values of a plurality of product batches such combinations whose total weight values fall within a predetermined range and are as near as possible to a predetermined value, characterized by the steps of selecting from said plurality of weight values a plurality of combinations having their total weight values within said predetermined range, and then selecting from said plurality of selected combinations a pair of combinations having no product batch in common, and having a sum of their total weight values closest to twice said predetermined value.

2. A combination weighing method as set forth in claim 1, characterized in that said selecting step includes steps of extracting from said plurality of combinations a predetermined number of combinations having total weight values which fall within said predetermined range and which ascend in order of deviation from said predetermined value, comparing said extracted combinations two by two in said order to extract a predetermined number of pairs of combinations having no batch of product in common, and selecting from said extracted pairs of combinations a pair of combinations having total weight values whose sum is nearest to said predetermined value.

3. A combination weighing method used for delivering quantities of product measured by weight with each quantity being of an acceptable weight relative to a reference weight, utilizing a set of devices each adapted for holding a batch of product weighing a fraction of said quantity and each adapted for unloading of said batch therefrom to contribute to a delivery, said method comprising the steps of:
generating values of combinations of weights of said batches;
selecting from said combinations a plurality of pairs of combinations, each combination of each pair being of said acceptable weight and including no batch in common with the batches of the other combination of the pair;
selecting from said pairs of combinations the pair having the smallest total weight value; and
unloading the devices corresponding to said selected pair of combinations to make two deliveries.

4. A combination weighing method as set forth in claim 3 wherein the devices corresponding to one combination of said selected pair of combinations having the smallest total weight value are unloaded into one collecting device and the devices corresponding to the other combination of said selected pair of combinations are unloaded into a second collecting device.

5. A combination weighing method as set forth in claim 3 wherein the devices corresponding to one combination of said selected pair of combinations having the smallest total weight value are unloaded into a collecting device and, after a predetermined time delay, the devices corresponding to the other combination of said selected pair are unloaded into the same collecting device.

6. A combination weighing method as set forth in claim 3 further comprising comparing said generated values with an acceptable weight standard to select combinations of acceptable weight, selecting from said acceptable combinations a predetermined number of combinations having total weight values closest to said reference weight, and selecting from said predetermined number of combinations said plurality of pairs of combinations.

* * * * *

UNITED STATES PATENT AND TRADEMARK OFFICE
CERTIFICATE OF CORRECTION

PATENT NO. : 4,742,877

DATED : May 10, 1988

INVENTOR(S) : Shozo Kawanishi

It is certified that error appears in the above—identified patent and that said Letters Patent is hereby corrected as shown below:

Column 2, line 40, "Accordingly, their average" should read --The average--. Column 4, line 50, "signal $W_i$ (now $W_i$) should read --signal $W_i$ (now $W_1$)--. Column 5, lines 32-33, "TW and UL and corresponding" should read --TW and UL and the corresponding--. Column 5, line 54, "proram" should read --program--. Column 6, line 11, under the heading Cycle there is a blank in the space for the first entry, whereas under the heading Cycle the first entry should be --1--. Column 8, line 18, "While two set" should read --While two sets--. Column 8, line 32, "interval as elapsed" should read --interval has elapsed--. Column 9, line 2, "CMhd 1) are determined" should read --$CM_1$) are determined--. Column 9, line 13, "sub-combinations" should read --sub-combination--.

Signed and Sealed this

Twenty-seventh Day of December, 1988

Attest:

DONALD J. QUIGG

*Attesting Officer*  *Commissioner of Patents and Trademarks*